Sept. 14, 1965 S. PURE 3,206,719
COMPASS DIRECTION INDICATING SYSTEM
Filed March 29, 1963
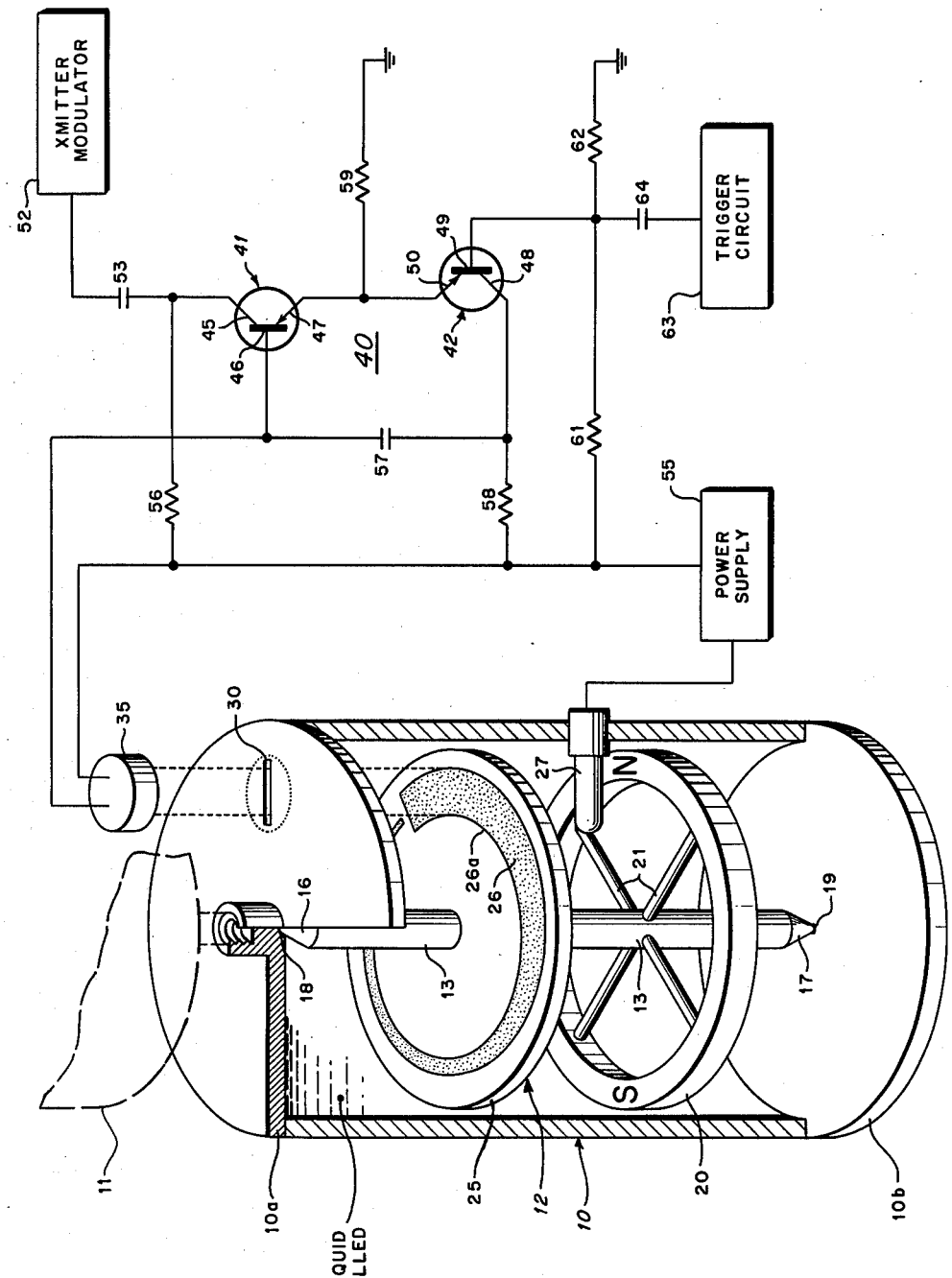
INVENTOR.
SAMUEL PURE
BY
ATTORNEY United States Patent Office 3,206,719
Patented Sept. 14, 1965

3,206,719
COMPASS DIRECTION INDICATING SYSTEM
Samuel Pure, Rydal, Pa., assignor to the United States of America as represented by the Secretary of the Navy
Filed Mar. 29, 1963, Ser. No. 269,219
4 Claims. (Cl. 340—2)
(Granted under Title 35, U.S. Code (1952), sec. 266)

The invention herein described may be manufactured and used by the Government of the United States of America for governmental purposes without the payment of any royalties thereon or therefor.

The present invention relates generally to directional sonobuoy orientation systems and more particularly to compass systems wherein direction indications are provided by substantially frictionless cooperating elements.

In directional sonobuoys it is important that the orientation of the hydrophone with respect to some fixed point such as magnetic north, is known. When instruments such as magnetic compasses and the like are used for orientation purposes the actuating forces have been found to be so small that it cannot be used to operate any mechanism beyond the movable element itself without introducing inaccuracies which would render the system inoperative from a practical standpoint. When attempts were made to use a variable capacitor rotated by a permanent magnet in the earth's field, the capacitor varying with the frequency of an oscillator, it was found that this method required large capacitor plates and required heavy magnets to rotate the same thereby incurring large angles of doubt between the maximum and the minimum portions of the capacitor. Another attempted method utilized the phase shift between two sine waves resulting from changes in the earth's magnetic flux through the compass. This is known as the flux gate compass and was found to introduce a large error in the northern and southern latitudes due to the vertical component in the earth's field.

An object of the present invention, therefore, is to provide an apparatus for transmitting compass information which permits the use of a compass which is extremely small and relatively light in weight and which apparatus develops substantially frictionless operation in the transmission of compass direction or deviation from a preset location.

Another object of the present invention is to transmit compass information by the use of apparatus which is inexpensive, simple to operate and construct, and one which is extremely reliable and sensitive in operation.

Various other objects and advantages will appear from the following description of an embodiment of the invention and the novel features will be particularly pointed out hereinafter in connection with the appended claims.

In the drawing:

The single figure is a schematic diagram illustrating an embodiment of the invention wherein the compass housing is illustrated in partial section and the hydrophone in dashed lines.

Referring to the drawing in detail, there is shown a cylindrical housing or container generally noted at 10 for rotatably housing the rotating assembly generally indicated at 12. The housing or container 10 is filled with a liquid such as a light oil or the like for damping the relative rotative movement of the rotating assembly 12 within the cylindrical container 10.

The rotating assembly 12 comprises a rigid rod-like shaft 13 having tapered ends 16 and 17 loosely engaging indentations 18 and 19 formed in the upper and lower end plates 10a and 10b, respectively, of the cylindrical container 10. The floating action of the assembly 12 caused by the damping fluid contained in housing 10 together with the guiding function provided by the indentations 18 and 19 permit the assembly 12 to freely rotate without developing any substantial restraining frictional forces which might retard any relative rotational movement between housing 10 and assembly 12.

It should be noted that the identations 18 and 19 formed in the upper and lower end plates 10a and 10b, respectively, are located substantially in the center of the above-noted end plates and provide a substantially vertical axis about which the assembly 12 may rotate.

A permanent magnet 20 of ring-like configuration is centrally disposed about and rigidly secured to the rigid shaft 13 by means of radial pins 21 in a manner known to those skilled in the art. Vertically disposed above the ring magnet 20 is a disc element 25 also axially disposed and rigidly secured to the rigid shaft 13. The disc element 25 includes a transparent window 26 which extends therethrough and progressively and linearly varies in area as the same extends circumferentially about the disc element 25.

Interposed between the ring magnet 20 and the disc element 25 is a light source 27 such as a neon lamp or the like which is rigidly secured to the wall of the cylindrical container 10. The light source 27 extends sufficiently within the container 10 to extend beyond the inner surface 26a of the transparent window 26.

The upper end plate 10a has formed therein a slot 30 positioned vertically above the transparent window 26 and light source 27 and of a length greater than the maximum width of the transparent window for permitting the passage of light through the end plate 10a to a light sensitive device. Also disposed on the upper end plate 10a is an internally threaded sleeve element for connecting the cylindrical container 10 to a sonobuoy-hydrophone arrangement, the hydrophone 11 being shown in phantom line.

Disposed above the slot 30 and secured to the plate 10a is a light sensitive device 35 such as a photo diode or the like for measuring the intensity of light passing through the slot 30; the photo diode providing a resistance proportional to the intensity of light received by the photo diode and being shown exploded away from the slot 30 for purposes of clarity.

Therefore, it is readily seen that the window 26 has a transmitting area which varies with the rotation of the assembly 12 about its axis and that the opening area and thus the amount of light exposed to the photo diode 35 would depend upon the orientation of the light means 27 with respect to the window 26 or, viewed in another way, the orientation of the hydrophone secured to the sonobuoy.

In order to utilize the information obtained by the photo diode 35 which information is measured as a function of the intensity of light transmitted through the window 26 which in turn is indicative of the location of the ring magnet 20, the photo diode 35 is interposed within a multivibrator circuit 40 and is utilized to vary the pulse width obtained from a triggered multivibrator output; the output of the circuit then being applied to the sonobuoy transmitter modulator 52 for transmission to a remote receiver. It is therefore readily seen that the combination of the photo diode with the fixed light source and variable area transparent window act as a variable resistor which is used to indicate the relative position of the sonobuoy hydrophone with respect to magnetic north.

Referring again to the figure, there is shown an electronic circuit generally indicated by the reference numeral 40 and including a pair of semi-conductor devices 41 and 42, which may comprise transistors of the PNP type.

For convenience, the terms emitter, collector and base, conventionally employed to designate the operative parts of a transistor, will be used below. It is to be understood, however, that the terms as employed herein are intended to be illustrative and not restrictive.

The semi-conductor devices 41 and 42 associated components are connected to form a single-shot multivibrator. This single shot generator is triggered by a pulse from the trigger circuit 63 of any conventional arrangement known to those skilled in the art. The composite circuitry forms a pulse generator having output pulses appearing between the output terminal and ground which are adjustably variable in width. The width of the output pulse, which is applied to a transmitter modulator 52, is proportional to the variable resistance interposed by the photodiode 35, the value of which is determined by the intensity of light incident thereto emanating from light source 27 and controlled by window 26.

In particular, the multivibrator circuit 40 comprises a semi-conductor device 41 having a collector electrode 45, a base electrode 46 and an emitter electrode 47 and a semi-conductor device 42 having a collector electrode 48, a base electrode 49 and an emitter electrode 50. Collector electrode 45 is connected to the input terminal of transmitter modulator 52 through capacitor 53 and is additionally coupled to the power supply 55 through resistor 56. It should be noted that the source at 55 provides power for the light means 27 located within the housing 10.

The photo diode or variable resistor 35 has one terminal thereof connected to the power supply 55 and the other terminal coupled to the base electrode 46, which in turn is interconnected by capacitor 57 to the collector electrode 48 and by resistor 58 to the power supply 55. The emitter electrodes 47 and 50 of semi-conductor devices 41 and 42, respectively, are conjoined and are further coupled in common to a point of reference potential, for example ground, through resistor 59.

The base electrode 49 of semi-condutor 42 is coupled to power supply 55 and to the common point of refernce through resistors 61 and 62, respectively. The base electrode 49 is further connected to trigger circuit 63 by resistor 64, the trigger circuit being of any conventional arrangement the details of which are not part of the present invention.

The operation of the compass system circuit described above is as follows. When the power supply 55 is in the operational state, the photo diode 35 will interpose within the circuit 40 a resistance representative of the intensity of light produced by the light source 27 and at the same time resistor 41 will be in saturation and transistor 42 will be at cutoff due to bias arrangements and transistor regeneration. Upon the application of a negative pulse from the trigger circuit 63 through coupling capacitor 64 to the base 49 of transistor 42, the transistor 42 will begin to conduct. It is to be noted that although the circuit is described with a negative pulse applied at the input, other means of triggering may be used.

The high negative voltage at the collector 48 of transistor 42 begins to fall, this positive-going voltage being coupled to the base 46 of transistor 41 and decreasing the forward bias. The base current and collector current of transistor 41 begin to decrease, the collector voltage of transistor 41 increasing negatively. A portion of this voltage is coupled through resistor 61 to the base 49 of transistor 42, increasing its negative potential. This regeneration results in a rapid change of both transistors; it drives transistor 42 into saturation and transistor 41 into cutoff. Since capacitor 57 was initially charged to a potential almost equal to the input voltage, the base of transistor 41 is at a positive potential almost equal to the magnitude of the input power supply voltage.

Capacitor 57 discharges through resistor 35 and the low saturation resistance of transistor 42. The base potential of resistor 41 becomes less positive and when the base potential of transistor 41 becomes slightly negative, transistor 41 again conducts. The collector potential of transistor 41 increases positively and is coupled to the base of transistor 42 dropping it into cutoff. Transistor 42 is again at cutoff and transistor 41 is in saturation with its collector voltage almost at zero. This stable condition is maintained until another pulse triggers the circuit.

The output for the transmitter modulator is taken from the collector of transistor 41; the time duration of the output pulse being determined by the time constant of resistor 35 and capacitor 57 during discharge. It is noted that if the resistance of 35 is increased, the length of the output pulse is also increased. The thus acquired pulse length may be utilized to provide the information desired, that is, the compass heading of the hydrophone of the sonobuoy.

Describing the mechanical operation of the compass system, the hydrophone 11 is rigidly interconnected with the cylindrical container 10, the hydrophone being shown in dotted lines and having its vertical receiving plane in vertical alignment with the source of light 27 and slot 30. Alternatively, the hydrophone may be oriented at any angle with respect to the light 27 and slot 30 as long as the angle is measured and correction made subsequently. It is to be noted that the disc 26 is so oriented with respect to the ring magnet 20 that the window portion of greatest area is in vertical alignment with the north pole of the ring magnet and is fixed in this position. Therefore, it is readily seen that when the hydrophone faces in a northerly direction, the light means 27 will overlie the north pole of the ring magnet and project a beam of light which will extend through the largest area of the window 26 and be received by the photo diode 35 as the light passes through the slot 30 in the end member 10a. It is understood that the hyrdophone and container 10 secured and interconnected therewith is both free to rotate due to the action of water acting on the sonobuoy or is rotated by some external means. As the hydrophone and associated cylindrical container 10 rotate about a vertical axis, the ring magnet and upper disc will remain relatively stationary as the container rotates thereabout. The light means 27 secured to the container 10 will also rotate and produce an intensity of light received by the photo diode 35 representative of the angular position of the hydrophone. For example, when the hydrophone rotates until it faces in the southerly direction the light means 27 will also rotate until it overlies the south pole of the ring magnet 20 and will transmit light through the window 26 having an area less than the area of the window above the north pole.

It is also understood that the window 26 is so calibrated that the intensity of light being received by the photo diode can be converted into information to determine the angular relationship of the hydrophone with respect to the north pole.

Although the above description of the mechanical apparatus indicates an illustrative embodiment of the present invention and description of its operation, it should not be construed as limiting, but rather illustrative, and it should further be obvious that there are equivalent arrangements whereby the hydrophone can be installed and indexed with respect to the north pole of the magnet so that the deviation from the north may be noted.

Obviously, many modifications and variations of the present invention are possible in the light of the above teachings. It is, therefore, to be understood that within the scope of the appended claims the invention may be practiced otherwise than as specifically described.

What is claimed is:

1. A system for indicating the angular relationship of a rotatable directional sonobuoy hydrophone with respect to magnetic north comprising:

a rotatable cylindrical housing having a vertically spaced light source and photodiode means secured thereto, said housing including upper and lower end members and being filled with damping fluid, a centrally disposed indentation formed on the interior surface on each of said end members, said indentations being in vertical alignment, a hydrophone fixedly secured with respect to said cylindrical housing, a compass assembly within said housing including a rotatable shaft, having the ends thereof loosely seated in said indentation, a ring magnet coaxiallly disposed about and rigidly secured to said shaft, and a disc member rigidly secured to said shaft between said light source and said photodiode means, said disc member including a uniformly tapering window means for variably impeding the quantity of light directed toward said photodiode, the center line of said tapering window being radially equidistant from the central axis of said shaft, said photodiode means having a resistance which varies linearly as a function of the light transmitted through said window; whereby the quantity of light received by said photodiode is indicative of the angular relationship of the hydrophone and magnetic north, and circuit means connected to said photodiode means providing an output pulse having a duration proportional to said light intensity.

2. The indicating system of claim 1 wherein said circuit means includes a monostable multivibrator means, and said photodiode forms the part of the time constant constant circuit for the monostable multivibrator means whereby the output pulse of said monostable multivibrator means has a duration proportional to the resistance of said photodiode.

3. The indicating system of claim 2 wherein a trigger circuit is connected to the monostable multivibrator means for causing said monostable multivibrator means to operate.

4. The indicating system of claim 2 wherein a transmitter modulator is connected to said monostable multivibrator means for transmitting a signal proportional to the duration of said pulse.

References Cited by the Examiner

UNITED STATES PATENTS

| 2,448,878 | 9/48 | Ferrel | 340—2 |
| 2,969,672 | 1/61 | Sell et al. | 73—189 |
| 2,979,626 | 4/61 | Pinckaers | 331—66 X |
| 3,068,692 | 12/62 | Morgan | 73—189 |
| 3,128,386 | 4/64 | Hughes | 250—237 |

FOREIGN PATENTS

| 753,839 | 8/33 | France. |

OTHER REFERENCES

Hasler et al.: Electronics July 17, 1959, pages 48 and 49 relied on.

CHESTER L. JUSTUS, *Primary Examiner*.